Sept. 6, 1932.  R. J. NORTON  1,875,645
BRAKE MECHANISM
Filed Jan. 9, 1929

Inventor
RAYMOND J. NORTON
By M. W. McConkey
Attorney

Patented Sept. 6, 1932

1,875,645

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE MECHANISM

Application filed January 9, 1929. Serial No. 331,296.

This invention relates to brake mechanisms and more particularly to an improved combination of a brake member and friction material.

The usual automotive brake mechanism comprises a drum secured to a vehicle wheel, or propeller shaft, with which is associated an internal brake shoe or external strap. The shoe or strap is of metal and is provided with apertures to receive the rivets which hold the friction material. In some instances the engaging surface of the friction material is formed with countersinks so that the head of the rivet will initially extend below the surface and will not contact with the adjacent braking flange on the drum. In most cases however the rivet is merely forced down into the more or less flexible asbestos facing without any previous countersinking of the tape.

In either case, after the friction facing has worn down, the rivet heads contact with the braking flange and abrade the metal. This results in diminished braking efficiency, noisy operation and the ultimate necessity of replacement of the brake drum. In the average case, when little attention is paid to the position or effect of the securing rivets, the brake drum becomes so scarified before about twenty thousand miles of service that it should be replaced.

It is a major object of the invention to provide a brake shoe assemblage in which the use of detachable securing means is eliminated.

Another object is to prolong the effective life of brake drums by minimizing the danger of metallic contact therewith.

A further object is to provide a novel method of attaching friction facings to brake shoes.

Yet another object is to facilitate the relining of brake shoes.

With these and other equally important objects in view the invention comprehends the attachment of a friction facing to a brake shoe (or strap) by adhering or cementing the parts together and thereby eliminating the use of detachcable metallic securing members such as rivets and the like.

Briefly considered the method of effectuating the invention comprises incorporating a requisite amount of rubber or similar material in that portion of the friction facing adjacent the metallic shoe or strap and then bonding the material directly to the metal.

The invention is illustrated, in the accompanying drawing, as embodied in a well known type of servo brake. In the drawing the same reference numerals refer to similar parts throughout the several views of which;

Figure 1:
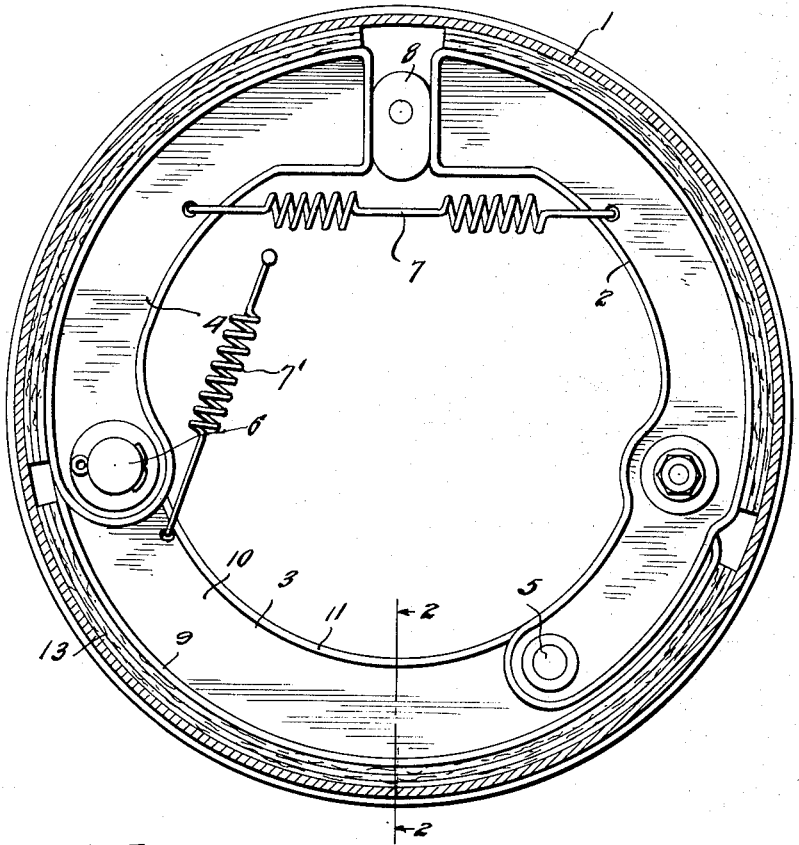
Fig. 1 is an elevation of a brake drum and associated shoe structure.
Figure 2:
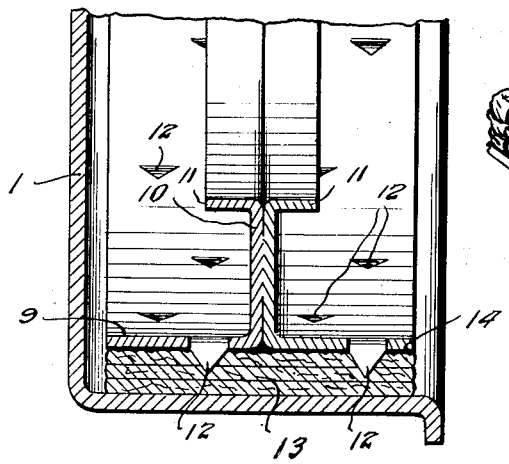
Fig. 2 is an enlarged cross section taken on line 2—2 of Fig. 1.
Figure 3:
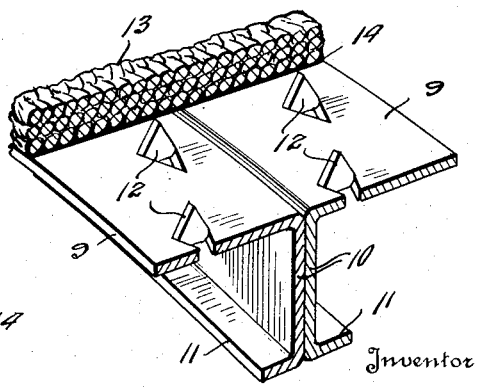
Fig. 3 is an enlarged detail of the shoe and lining.

The apparatus shown in the drawing, which typifies any desired form of brake, comprises a brake drum 1 within which are mounted the shoes 2, 3 and 4. The shoe 2 is pivotally connected to the intermediate shoe 3 at 5. The intermediate shoe is pivotally connected to the servo shoe 4 at 6 and at its other end is anchored on the backing plate.

A return spring 7 is connected to the shoes 2 and 4 to retain them normally in inoperative position. A second spring 7' is connected at one end to the backing plate and at the other adjacent the unanchored end of the anchored shoe 3. The shoes may be spread apart into engagement with the drum by suitable spreading means such as the cam 8.

The brake shoe structure may comprise a pair of substantially L shaped members secured back to back as by a riveted or fused connection. As shown, each shoe comprises a braking flange section 9, a central web 10 and a terminal rigidifying or strengthening flange 11.

As indicated hereinbefore, the usual method of attaching the brake lining to the metallic shoe structure consists in passing rivets through the asbestos and heading over the protruding ends against the inside face of the shoe. According to the present invention such a method of attachment is dispensed with. In sharp contradistinction to the usual procedure the present method comprises adhering the lining directly to the brake shoe.

In the preferred embodiment the shoe is formed with integral projections 12 which may be cut out and punched up from the material of the shoe. These projections are adapted to extend a short distance into the friction facing 13 and, as will be understood, serve to transmit the circumferential thrust from the lining to the shoe. The friction facing may be held against radial displacement relative to the braking flange by a bonding or adherent layer 14.

In order to insure a firm and enduring bond between the lining and the metallic shoe, it is preferable to modify the usual lining. As an example, the surface of the lining which is adjacent the braking flange of the shoe may first be treated with a suitable rubber containing solution in such a manner as to disperse the rubber through the fibers in the area adjacent the brake shoe, or the surface of the metal, or both, may be coated with a suitable bonding agent such as sulphur chloride in a solvent such as benzol. To increase the penetration and dispersion of the sulphur chloride, the face of the lining may first be wetted by a solvent such as benzene.

After such preliminary treatment, the lining is forced down on the shoe so that the members 12 project into the lining and the lower face of the lining rests flatly against the surface of the shoe. The shoe may then be placed in a press and heated for a sufficient length of time to cure the rubber. After such treatment, the lining is firmly attached to the metallic shoe by means of the bond presented by the intermediate rubber section.

If desired, the lining may be made up of laminated material so constructed as to provide a refractory intermediate layer or layers which serve to protect the metal bonding layer from the generated frictional heats. As an example, the lining may be made up, as shown in the drawing, of three layers. The outer layer, which contacts with the drum, may be asbestos tape treated with the usual or any preferred type of impregnants. The lower layer may comprise any suitable fabric in which is incorporated a curable rubber composition. These two layers, or sections, may be bonded together by an intermediate strip comprising a refractory asbestos cement which has the property of firmly adhering to the laminae.

Such a lining may be applied to the shoe in the manner described hereinbefore and the lower layer bonded or cemented directly to the metal. The intermediate layer, as will be understood, serves not only to join the upper and lower strip but also protects the lower layer and the metal of the shoe from the generated frictional heats.

It will be understood that the invention is susceptible of a wide range of modifications not only as to the material used for the lining and for the bonding agent, but also as to the particular methods employed to effect the cementation of the whole lining to the shoe. The specific examples described are given merely as examples of such modifications as embody the underlying principle namely, the elimination of the usual metallic securing means by bonding the lining directly to one of the brake members.

I claim:

1. A wheel brake member comprising metallic shoe and a friction facing bonded to the shoe throughout the contacting are and means to protect the bonded area from frictional heats.

2. A wheel brake member comprising metallic shoe having radially projecting sections, and a friction facing bonded to the shoe, and means to shield the bonded are from frictional heats.

3. A wheel brake member comprising metallic shoe having a braking flange, radially projecting sections on the braking flange and a fibrous friction material enclosing the projections and bonded to the flange, the material embodying means to protect the bonded area from frictional heats.

4. A wheel brake member comprising metallic shoe and a friction facing bonded to the shoe by a non-metallic means, and means to protect the bonding means from frictional heats.

5. A wheel brake member comprising metallic shoe, a friction material adhered to the shoe substantially throughout its circumference and means on the shoe projecting into the friction material and adapted to prevent relative longitudinal displacement thereof and means to shield the adhered area from generated frictional heats.

6. A wheel brake member having a metallic part and a fibrous part cemented together and means, included in the fibrous part, to protect the cemented area from friction heats.

7. A wheel brake member comprising an arcuate metallic section having integral radially extending projections, a friction facing fitting over the projections and cemented to the section throughout the contacting area and an insulating material embodied in the facing and adapted to protect the cemented section from frictional heats.

8. A brake member comprising a metallic shoe, a layer of material bonded to the shoe a layer of friction material, and an inte mediate layer binding the friction layer to the bonded layer.

9. A brake member comprising a metallic shoe, a layer of material bonded to the shoe, a layer of friction material, and an intermediate layer binding the friction layer to the bonded layer and protecting the bonded layer from frictional heats.

10. A wheel brake member comprising an arcuate metallic section having integral radially extending projections, a friction facing fitting over the projections and cemented to the section throughout the contacting area, and a layer of insulating material embodied in the facing and adapted to protect the cemented section from frictional heats.

In testimony whereof I affix my signature.

RAYMOND J. NORTON.